(12) United States Patent
Tohyama et al.

(10) Patent No.: US 9,765,828 B2
(45) Date of Patent: Sep. 19, 2017

(54) FRICTION PLATE PROVIDED WITH CORE PLATE AND MANUFACTURING METHOD THEREFOR

(71) Applicant: NSK-WARNER K.K., Shinagawa-ku, Tokyo (JP)

(72) Inventors: Kazuyuki Tohyama, Fukuroi (JP); Hidetoshi Maeda, Fukuroi (JP); Shinichirou Ikegami, Fukuroi (JP); Atsuhiro Kano, Fukuroi (JP)

(73) Assignee: NSK-WARNER K.K., Tokyo (JP)

( * ) Notice: Subject to any disclaimer, the term of this patent is extended or adjusted under 35 U.S.C. 154(b) by 37 days.

(21) Appl. No.: 14/805,465

(22) Filed: Jul. 21, 2015

(65) Prior Publication Data

US 2016/0025155 A1 Jan. 28, 2016

(30) Foreign Application Priority Data

Jul. 24, 2014 (JP) ................. 2014-150455

(51) Int. Cl.

| | |
|---|---|
| *F16D 13/64* | (2006.01) |
| *C21D 1/09* | (2006.01) |
| *C21D 1/34* | (2006.01) |
| *C21D 9/00* | (2006.01) |
| *C22C 38/00* | (2006.01) |
| *F16D 13/68* | (2006.01) |
| *F16D 55/40* | (2006.01) |

(52) U.S. Cl.
CPC ............ *F16D 13/648* (2013.01); *C21D 1/09* (2013.01); *C21D 1/34* (2013.01); *C21D 9/0068* (2013.01); *C22C 38/00* (2013.01); *F16D 13/683* (2013.01); *F16D 55/40* (2013.01); *F16D 2200/0021* (2013.01); *F16D 2250/0053* (2013.01)

(58) Field of Classification Search
CPC ...... F16D 13/648; F16D 55/40; F16D 13/683; F16D 2250/0053; F16D 2200/0021; C21D 1/34; C21D 1/09; C22C 38/00
See application file for complete search history.

(56) References Cited

U.S. PATENT DOCUMENTS

| | | | | |
|---|---|---|---|---|
| 4,304,978 A | * | 12/1981 | Saunders ................. | C21D 1/09 219/121.12 |
| 6,311,815 B1 | * | 11/2001 | Riggle .................... | F16D 13/64 192/107 M |
| 2008/0053384 A1 | * | 3/2008 | Haake ...................... | C21D 1/09 123/18 R |
| 2012/0160629 A1 | * | 6/2012 | Tsioptsias .............. | C21D 1/607 192/66.1 |
| 2015/0013855 A1 | * | 1/2015 | Bergeson ................. | C21D 1/38 148/565 |
| 2015/0369301 A1 | * | 12/2015 | Tagashira ................. | C21D 8/02 148/546 |
| 2016/0208354 A1 | * | 7/2016 | Tateishi ................... | C21D 6/00 |

\* cited by examiner

*Primary Examiner* — David J Hlavka
(74) *Attorney, Agent, or Firm* — Shapiro, Gabor and Rosenberger, PLLC

(57) ABSTRACT

A method for manufacturing a friction plate provided with a core plate includes subjecting a spline portion formed at an outer periphery or an inner periphery of the core plate to a hardening process by laser.

13 Claims, 2 Drawing Sheets

US 9,765,828 B2

FRICTION PLATE PROVIDED WITH CORE PLATE AND MANUFACTURING METHOD THEREFOR

BACKGROUND OF THE INVENTION

Field of the Invention

The present invention relates to a friction plate provided with a core plate of a multiple-disc clutch used for a power transmission portion of automatic transmission for vehicles and a method for manufacturing the friction plate. The present invention relates, more specifically, to a method for subjecting a spline portion of a friction plate in a multiple-disc lockup clutch for a torque converter for an automatic transmission to a laser hardening.

Description of the Related Art

Hardening methods using heat treatments have been conventionally used to enhance wear resistance of a spline portion of a core plate, formed of a low carbon-steel material, of a friction plate for a wet-type multiple-disc clutch.

As typical heat treatment methods that a spline portion of a core plate is subjected to, high frequency, carbon nitriding and the like are utilized. However, these heat treatment methods have been unsatisfactorily performed fine control in selecting a hardening portion of spline portion, setting a hardening depth and the like.

On the other hand, heat treatments are generally performed in a state where a certain number of core plates, each of which is a thin plate and is used for a friction plate, are stacked and fixed, in consideration of deformation after the heat treatments. However, such treatments have a disadvantage that a separating process is necessary for welding caused after the heat treatments since the core plates are stacked and fixed.

SUMMARY OF THE INVENTION

Accordingly, an object of the invention is to provide a method for manufacturing a friction plate provided with a core plate, by using laser processing as a heat treatment method which does not depend on a shape of spline portion and by which a hardening portion can be selected as desired and a separating step after the processing becomes unnecessary.

To achieve the above mentioned object, a method for manufacturing a friction plate with a core plate, comprises: subjecting a spline portion formed at an outer periphery or an inner periphery of the core plate to a hardening process by laser.

Upon performing the laser processing, a slope portion of the spline portion formed at an outer periphery or an inner periphery of the core plate is subjected to the laser processing so as to have a hardening depth of 0.1 mm or deeper from the surface of the slope portion.

According to the invention, the following effects are obtained.

In a core plate of a friction plate of a wet-type multiple-disc clutch, a portion subjected to hardening can be selected as desired and a hardening depth can be controlled, without depending on the shape of a spline portion.

Further, even if core plates are in a stacked and fixed state, a step for correcting flatness after the heat treatment can be eliminated by subjecting them to hardening by laser.

Furthermore, a separating step after heat treatment of core plates becomes unnecessary, since even if core plates are processed in a state where they are stacked and fixed, the core plates are not welded with each other.

Further features of the present invention will become apparent from the following description of exemplary embodiments with reference to the attached drawings.

DESCRIPTION OF THE EMBODIMENTS

Figure 1:
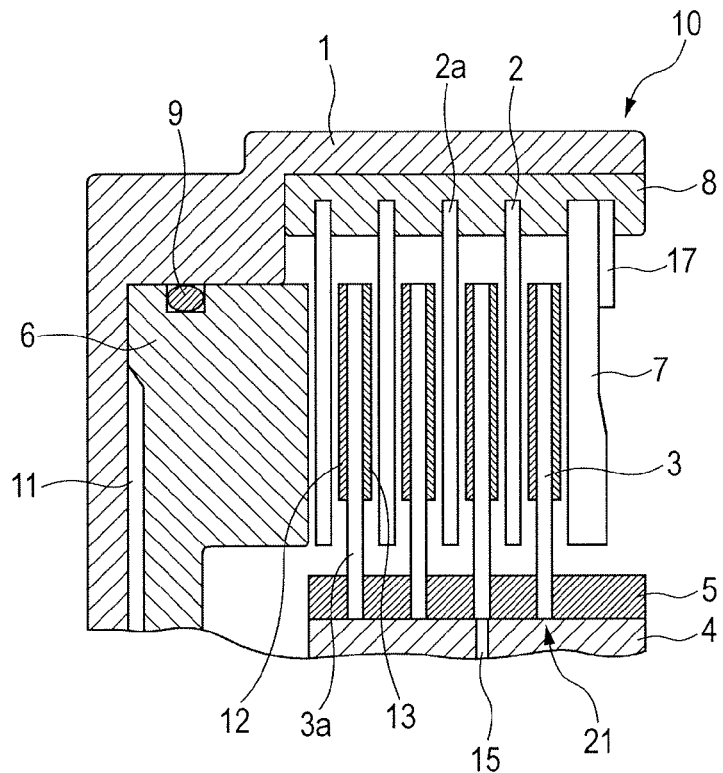
FIG. 1 is a partial sectional view in the axial direction of a wet-type multiple-disc clutch provided with friction plates in accordance with the first embodiment of the invention.

The following will describe the present invention in detail with reference to the accompanying drawings. In the drawings, the same components are denoted by the same reference numerals.

FIG. 1 is a partial sectional view in the axial direction of a wet-type multiple-disc clutch 10 provided with friction plates in accordance with the first embodiment of the invention.

The wet-type multiple-disc clutch 10 is constituted of a substantially cylindrical clutch drum 1, which is open at one end in an axial direction, a hub 4, which is disposed on the inner periphery of the clutch drum 1 and which coaxially and relatively rotates, annular separator plates 2, which are disposed on a spline 8 movably in the axial direction, the spline 8 being provided on the inner periphery of the clutch drum 1, and annular friction plates 3, which are disposed alternately with the separator plates 2 in the axial direction and which have friction surfaces to which friction material segments are fixed with an adhesive agent or the like. Each of the separator plates 2 has a spline portion 2a, which engages with the spline 8, and each of the friction plates 3 has a spline portion 3a, which engages with the spline 5 provided on the outer periphery of the hub 4. There are provided a plurality of the friction plates 3 and a plurality of the separator plates 2.

The wet-type multiple-disc clutch 10 is provided with a piston 6, which pushes and fastens the separator plates 2 and the friction plates 3, and a backing plate 7 and a stopper ring 17 retaining the backing plate 7, which are provided on the inner periphery of the clutch drum 1 to retain the separator plates 2 and the friction plates 3 in a fixed state at one end in the axial direction.

As illustrated in FIG. 1, the piston 6 is disposed such that it is slidable in the axial direction at the closed end of the clutch drum 1. An O-ring 9 is interposed between the outer circumferential surface of the piston 6 and the inner surface of the clutch drum 1. Further, a sealing member (not illustrated) is interposed between the inner circumferential surface of the piston 6 and the outer circumferential surface of the inner circumferential cylindrical portion (not illustrated) of the clutch drum 1. Thus, a hydraulic chamber 11 in an oil-tight state is defined between the inner surface at the closed end of the clutch drum 1 and the piston 6.

Friction material segments 12 and 13, which have predetermined friction coefficients, are fixed to both surfaces of each of the friction plates 3, which are retained by the hub 4 such that they are slidable in the axial direction. Alternatively, however, the friction material segments 12 and 13 may be provided on only one side of the friction plate 3. Further, the hub 4 has a lubricant supply port 15, which penetrates in the radial direction. Through the lubricant supply port 15, a lubricant is supplied from the inside diameter side to the outside diameter side of the wet-type multiple-disc clutch 10.

The wet-type multiple-disc clutch 10 having the foregoing construction engages (fastens) and disengages a clutch as described below. FIG. 1 illustrates a state in which the clutch has been disengaged, the separator plates 2 and the friction plates 3 being separated. In the disengaged state, the piston 6 is in contact with the closed end of the clutch drum 1 due to the urging force of a return spring (not illustrated).

In order to engage the wet-type multiple-disc clutch 10 in the disengaged state, an oil pressure is supplied to the hydraulic chamber 11 defined between the piston 6 and the clutch drum 1. As the oil pressure increases, the piston 6 moves to the right in the axial direction in FIG. 1 against the urging force of the return spring (not illustrated), bringing the separator plates 2 and the friction plates 3 into close contact with each other. Thus, the wet-type multiple-disc clutch 10 is engaged.

In order to disengage the wet-type multiple-disc clutch 10 again after the wet-type multiple-disc clutch 10 is set to the engaged state, the oil pressure to the hydraulic chamber 11 is released. Upon releasing the oil pressure, the urging force of the return spring (not illustrated) causes the piston 6 to move to the position where the piston 6 comes in contact with the closed end of the clutch drum 1. Thus, the wet-type multiple-disc clutch 10 is disengaged.

(First Embodiment)

Figure 2:
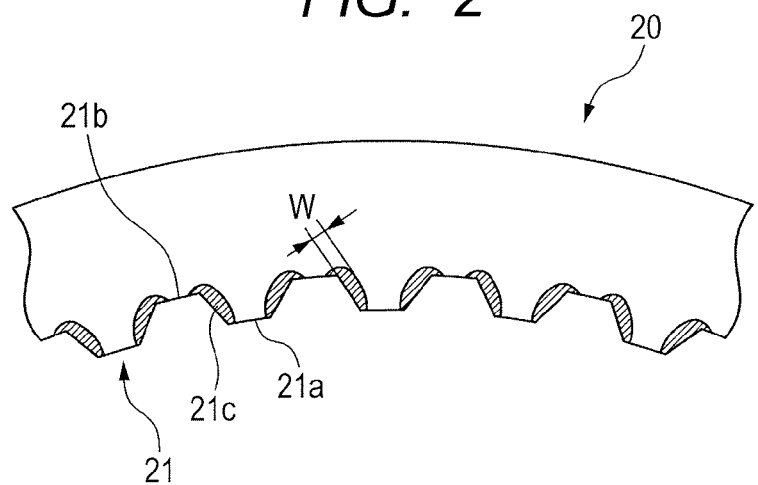
FIG. 2 is a partial front view illustrating a core plate according to a first embodiment of the invention.

FIG. 2 is a partial front view illustrating a core plate 3 according to a first embodiment of the invention. The friction plate 3 is formed by fixing annular friction plates 12 and 13, or a plurality of friction material segments (not illustrated) annually to a substantially annular core plate 20 with an adhesive agent or the like. The core plate 20 formed of a low carbon-steel plate is provided with a spline portion 21, which engages with the spline 5 of the hub 4, at an inner periphery.

Although FIG. 2 illustrates a part of friction plate 3, it is needless to say that the friction plate 3 is annular and the same structure shown in FIG. 2 is repeatedly formed along the whole periphery of annular friction plate 3. Further, the friction material is omitted from the illustration of FIG. 2.

As illustrated in FIG. 2, the core plate 20 is provided with spline portions 21 at the inner periphery, namely, an inner diameter rim. Each of the spline portions 21 is provided with a peak portion 21a, a trough portion 21b, and a slope portion 21c between the peak portion 21a and the trough portion 21b.

Generally, when the friction plate 3 moves in an axial direction in spline coupling, the slope portion 21c of spline portion 21 tends to make sliding friction with a mating spline groove the most. Accordingly, all the slope portions 21c are subjected to a hardening process by laser. Such hardening process is performed in such a manner that a hardening depth W is 0.1 mm or deeper from the surface of slope portion 21c.

The hardening process by laser does not depend on a shape of spline portion 21, and allows a hardening portion to be selected as desired and the hardening depth to be controlled.

When the spline portion 21 is subjected to the laser hardening process, core plates 20 may be processed one by one. However, in consideration of deformation of core plates 20, the process may be performed in a state where the plurality of core plates 20 are stacked and fixed.

When the laser hardening process is performed in the state where the plurality of core plates 20 are stacked and fixed, a flatness correcting step becomes unnecessary after the heat treatment. Further, the core plates 20 are not welded with each other in the stacked and fixed process, so that a separating step of core plates 20, which has been necessary after a conventional heat treatment, can be eliminated.

(Second Embodiment)

Figure 3:
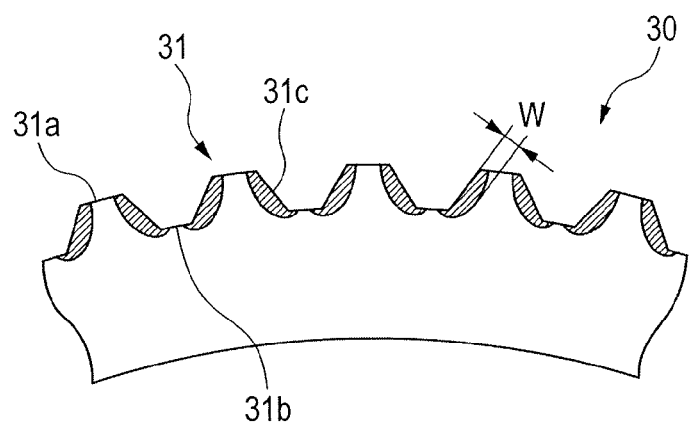
FIG. 3 is a partial front view illustrating a core plate according to a second embodiment of the invention.

FIG. 3 is a partial front view illustrating a core plate according to a second embodiment of the invention. Similarly to the first embodiment, the friction plate 3 is formed by fixing annular friction plates 12 and 13, or a plurality of friction material segments (not illustrated) annually to a substantially annular core plate 30 with an adhesive agent or the like. The core plate 30 formed of a low carbon-steel plate is provided with a spline portion 31, which engages with the spline 8 of the clutch drum 1, at an outer periphery.

Although FIG. 3 illustrates a part of friction plate 3, it is needless to say that the friction plate 3 is annular and the same structure shown in FIG. 3 is repeatedly formed along the whole periphery of annular friction plate 3. Further, the friction material is omitted from the illustration of FIG. 3.

As illustrated in FIG. 3, the core plate 30 is provided with spline portions 31 at the outer periphery, namely, an outer diameter rim. Each of the spline portions 31 is provided with a peak portion 31a, a trough portion 31b, and a slope portion 31c between the peak portion 31a and the trough portion 31b.

Generally, when the friction plate 3 moves in an axial direction in spline coupling, the slope portion 31c of spline portion 31 tends to make sliding friction with a mating spline groove the most, similarly to the first embodiment. Accordingly, all the slope portions 31c are subjected to a hardening process by laser. Such hardening process is performed in such a manner that a hardening depth W is 0.1 mm or deeper from the surface of slope portion 31c.

The hardening process by laser does not depend on a shape of spline portion 31, and allows a hardening portion to be selected as desired and the hardening depth to be controlled.

Similarly to the first embodiment, the laser hardening process may be performed in a state where the plurality of core plates 30 are stacked and fixed in the second embodiment. Thereby, a flatness correcting step becomes unnecessary after the heat treatment. Further, the core plates 30 are not welded with each other in the stacked and fixed process, so that a separating step of core plates 30, which has been necessary after a conventional heat treatment, can be eliminated.

Figure 4:
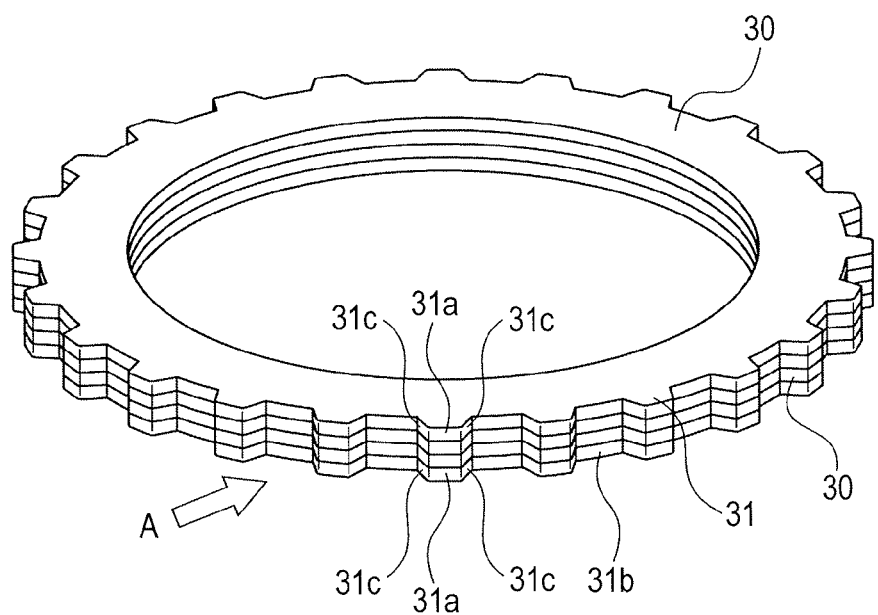
FIG. 4 is a perspective view illustrating a plurality of core plates for explaining an example of manufacturing method of the invention.

FIG. 4 is a perspective view illustrating a plurality of core plates for explaining an example of manufacturing method of the invention. In the example, four core plates 30 are stacked. In FIG. 4, the core plates 30 of the second embodiment are used for explanation, but it is needless to say that the method is applicable to the core plates 20 of the first embodiment.

As illustrated in FIG. 4, four core plates 30 are fixed in a state where they are stacked in an axial direction. In this state, the slope portions 31c of spline portions 31 are irradiated by laser from a laser source (not shown) in a direction as shown with an arrow A and subjected to the hardening process by laser. The same process can be applied to four core plates simultaneously, so that a whole processing time can be shortened and the flatness correcting step after the heat process becomes unnecessary. Further, the separating step of core plates 30, which has been necessary after a conventional heat process, can be eliminated, since the core plates 30 are not welded with each other by the stacked and fixed process. Accordingly, manufacturing costs can be reduced. Though four core plates 30 are stacked in this example, the number thereof may be varied as far as it is more than one, and the process can be performed in a state where five or more core plates are stacked. Laser may be irradiated in a direction other than shown in FIG. 4.

The core plate having the spline portion that is processed in the first and second embodiments may be used as either of a friction plate or a separator plate.

The invention explained above can be utilized as a method for manufacturing a friction plate of a multiple-disc clutch for an automatic transmission used for automobiles in order to improve wear resistance of spline portion of core plate formed of a low carbon-steel.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-150455, filed Jul. 24, 2014, which is hereby incorporated by reference herein in its entirety.

What is claimed is:

1. A method for manufacturing a friction plate with a core plate, comprising:
   subjecting a spline portion formed at an outer periphery or an inner periphery of the core plate to a hardening process by laser.

2. The method for manufacturing a friction plate, according to claim 1, wherein said core plate is formed of a low carbon-steel material.

3. The method for manufacturing a friction plate, according to claim 1, wherein a slope portion of said spline portion is subjected to said hardening process.

4. The method for manufacturing a friction plate, according to claim 3, wherein said hardening process is performed such that a hardening depth is 0.1 mm or more from a surface of said slope portion.

5. The method for manufacturing a friction plate, according to claim 1, wherein said hardening process is performed in a state where a plurality of said core plates are stacked in an axial direction.

6. A friction plate for a wet-type multiple-disc clutch, comprising: a core plate provided with a spline portion that is formed at an outer periphery or an inner periphery of the core plate and is subjected to a hardening process by laser.

7. The friction plate according to claim 6,
   wherein the spline portion has a peak portion, a trough portion, and a sloped portion between the peak and trough portions,
   wherein the sloped portion has been subjected to the hardening process by the laser, and
   wherein the peak and trough portions have not been subjected to the hardening process by the laser.

8. A method for manufacturing one or more friction plates, each friction plate having a respective core plate, the method comprising:
   using a laser, irradiating surface portions of a spline formed at a periphery of the core plate to harden the irradiated surface portions,
   wherein the spline has peak portions, trough portions, and sloped portions between the peak and trough portions,
   wherein the irradiated surface portions of the spline comprise the sloped portions, and
   wherein the peak and trough portions of the spline are not hardened by the irradiating.

9. The method according to claim 8,
   wherein a surface of each peak portion and a surface of each trough portion extend along a circumferential direction of the core plate, and
   wherein a surface of each sloped portion is angled so as to cross a radial direction of the core plate.

10. The method according to claim 8, wherein the core plate comprises a low carbon steel material.

11. The method according to claim 8, wherein the irradiated surface portions have been hardened to a depth of at least 0.1 mm.

12. The method according to claim 8, further comprising:
   prior to the irradiating using the laser, providing a plurality of the core plates axially stacked together,
   wherein the irradiating includes simultaneously irradiating surface portions of the respective splines of the core plates such that only sloped portions thereof are hardened.

13. The method according to claim 12,
   wherein, during the irradiating, the plurality of the core plates are stacked together without welding.

* * * * *